US012787013B2

(12) United States Patent
Xue et al.

(10) Patent No.: US 12,787,013 B2
(45) Date of Patent: Nov. 3, 2026

(54) COMMUNICATION METHOD AND APPARATUS

(71) Applicant: HUAWEI TECHNOLOGIES CO., LTD., Shenzhen (CN)

(72) Inventors: Yifan Xue, Shenzhen (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 214 days.

(21) Appl. No.: 17/634,510

(22) PCT Filed: Jul. 27, 2020

(86) PCT No.: PCT/CN2020/104985
§ 371 (c)(1),
(2) Date: Feb. 10, 2022

(87) PCT Pub. No.: WO2021/027551
PCT Pub. Date: Feb. 18, 2021

(65) Prior Publication Data

US 2022/0295528 A1 Sep. 15, 2022

(30) Foreign Application Priority Data

Aug. 15, 2019 (CN) ......................... 201910753227.6

(51) Int. Cl.
*H04W 72/23* (2023.01)
*H04L 5/00* (2006.01)

(52) U.S. Cl.
CPC ........... *H04W 72/23* (2023.01); *H04L 5/0042* (2013.01); *H04L 5/0098* (2013.01)

(58) Field of Classification Search
None
See application file for complete search history.

(56) References Cited

U.S. PATENT DOCUMENTS

2019/0103953 A1* 4/2019 Liao ...................... H04L 5/0098
2019/0261405 A1* 8/2019 Ang ...................... H04W 28/06
(Continued)

FOREIGN PATENT DOCUMENTS

CN 109496454 A 3/2019
CN 109788553 A 5/2019
(Continued)

OTHER PUBLICATIONS

CMCC, "Discussion on PDCCH-based power saving signal/channel design," 3GPP TSG RAN WG1 #97, R1-1906524, Reno, USA, May 13-17, 2019, 11 pages.
(Continued)

*Primary Examiner* — Faruk Hamza
*Assistant Examiner* — Cassandra L Decker
(74) *Attorney, Agent, or Firm* — Fish & Richardson P.C.

(57) ABSTRACT

Example communication methods and example apparatuses are provided. One example method includes receiving, by a terminal device, bandwidth part (BWP) switching indication information from a network device in a slot n, wherein the BWP switching indication information includes a first value and a minimum value of a first slot difference, and the first slot difference is an interval between a slot in which first data is transmitted and the slot n. The terminal device can then determine a first target slot based on the first value of the first slot difference and the slot n. The terminal device can then start to use the minimum value of the first slot difference in a start position of the first target slot.

20 Claims, 9 Drawing Sheets

(56) References Cited

U.S. PATENT DOCUMENTS

| | | | | |
|---|---|---|---|---|
| 2019/0313331 | A1* | 10/2019 | Zhang | H04W 52/0225 |
| 2020/0163035 | A1* | 5/2020 | Fu | H04L 1/1854 |
| 2020/0213067 | A1* | 7/2020 | Cirik | H04W 72/0453 |
| 2020/0314748 | A1* | 10/2020 | Kim | H04W 74/006 |
| 2021/0167930 | A1* | 6/2021 | Jeon | H04L 27/2607 |
| 2022/0021495 | A1* | 1/2022 | Zhang | H04L 5/0053 |
| 2022/0029752 | A1* | 1/2022 | Gou | H04L 1/1848 |
| 2022/0232611 | A1* | 7/2022 | Hakola | H04W 52/0229 |
| 2022/0239452 | A1* | 7/2022 | Kazmi | H04W 36/06 |
| 2022/0264611 | A1* | 8/2022 | Yoshimura | H04L 5/0094 |
| 2022/0279564 | A1* | 9/2022 | Li | H04W 72/0446 |
| 2023/0079660 | A1* | 3/2023 | Fu | H04L 5/0053 370/329 |
| 2023/0106098 | A1* | 4/2023 | Wang | H04L 1/1854 370/329 |
| 2023/0131118 | A1* | 4/2023 | Kim | H04W 52/0216 370/311 |

FOREIGN PATENT DOCUMENTS

| | | | | |
|---|---|---|---|---|
| CN | 109804662 | A | 5/2019 | |
| KR | 2020127808 | A * | 11/2020 | H04L 5/0053 |
| WO | 2018228501 | A1 | 12/2018 | |
| WO | 2019127138 | A1 | 7/2019 | |

OTHER PUBLICATIONS

OPPO, "Text proposal for DLUL data scheduling and HARQ procedure," 3GPP TSG RAN WG1 #94, R1-1808887, Gothenburg, Sweden, Aug. 20-24, 2018, 7 pages.

ZTE, "Remaining issue for BWP," 3GPP TSG RAN WG1 Meeting #93, R1-1806135, Busan, Korea, May 21-25, 2018, 3 pages.

Office Action in Japanese Appln. No. 2022-509118, dated Apr. 4, 2023, 8 pages (with English translation).

3GPP TS 38.213 V15.6.0 (Jun. 2019), "3rd Generation Partnership Project; Technical Specification Group Radio Access Network; NR; Physical Layer Procedures for Control (Release 15)," Jun. 2019, 107 pages.

3GPP TS 38.214 V15.6.0 (Jun. 2019), "3rd Generation Partnership Project; Technical Specification Group Radio Access Network; NR; Physical Layer Procedures for Data (Release 15)," Jun. 2019, 105 pages.

Extended European Search Report issued in European Application No. 20853359.6 on Aug. 16, 2022, 9 pages.

Huawei et al., "Procedure of Cross-Slot Scheduling for UE Power-Saving," 3GPP TSG RAN WG1 #97, R1-1906006, Reno, USA, May 13-17, 2019, 12 pages.

MediaTek Inc., "Summary of Cross-Slot Scheduling Power-Saving Techniques," 3GPP TSG RAN WG1 Meeting #97, R1-1907918, Reno, USA, May 13-17, 2019, 26 pages.

PCT International Search Report and Written Opinion issued in International Application No. PCT/CN2020/104985 on Oct. 19, 2020, 15 pages (with English translation).

Qualcomm Incorporated, "Cross-Slot Scheduling Power-Saving Techniques," 3GPP TSG-RAN WG1 #97, R1-1907295, Reno, USA, May 13-17, 2019, 16 pages.

Oppo, "UE adaptation on BWP/SCell operation," 3GPP TSG RAN WG2 Meeting #106, R2-1905605, Reno, USA, May 13-17, 2019, 5 pages.

Office Action in Japanese Appln. No. 2022-509118, mailed on Sep. 26, 2023, 8 pages (with English translation).

Qualcomm Incorporated, "Remaining Issues on BWP," 3GPP TSG RAN WG1 Meeting #92, R1-1802844, Athens, Greece, Feb. 26-Mar. 2, 2018, 24 pages.

Qualcomm Incorporated, "Open Issues on BWP," 3GPP TSG RAN WG1 #91, R1-1720693, Reno, NV, USA, Nov. 27-Dec. 1, 2017, 15 pages.

Office Action in Japanese Appln. No. 2024-040150, mailed on Jan. 7, 2025, 7 pages (with English Translation).

* cited by examiner

COMMUNICATION METHOD AND APPARATUS

CROSS-REFERENCE TO RELATED APPLICATIONS

This application is a national stage of International Application No. PCT/CN2020/104985, filed on Jul. 27, 2020, which claims priority to Chinese Patent Application No. 201910753227.6, filed on Aug. 15, 2019. Both of the aforementioned applications are hereby incorporated by reference in their entireties.

TECHNICAL FIELD

This application relates to the field of communications technologies, and in particular, to a communication method and an apparatus.

BACKGROUND

5th generation (5th generation, 5G) new radio (new radio, NR) supports the bandwidth part (bandwidth part, BWP) technology, to be specific, supports transmission between a network device and a terminal device by occupying a bandwidth part. On one carrier, the network device may configure a plurality of BWPs (including a plurality of uplink BWPs and a plurality of downlink BWPs) for the terminal device, so that the terminal device can support a plurality of services. In an existing standard, when the terminal device works in one cell, there is only one active downlink BWP and one active uplink BWP. However, the active BWP may be changed, and this is referred to as BWP switching.

Generally, the network device may indicate BWP switching by using downlink control information (downlink control information, DCI) used for scheduling data. For example, the terminal device receives one piece of DCI in a slot n on a downlink BWP1, and the DCI schedules the terminal device to receive downlink data (that is, data on a physical downlink shared channel (physical downlink shared channel, PDSCH)) in a slot n+M on a downlink BWP2. The terminal device starts to receive the downlink data in a start position of the slot n+M on the downlink BWP2.

Currently, research on power consumption reduction of the terminal device is increasingly popular. However, the foregoing BWP switching method fails to reduce power consumption of the terminal device. To conduct research on power consumption reduction of the terminal device, it is currently proposed that a power consumption reduction signal may be used to indicate BWP switching before an active time of connected mode (CONNECTED mode, C)-discontinuous reception (discontinuous reception, DRX) of the terminal device. A DRX cycle is configured for the terminal device. The DRX cycle includes “on duration (On Duration)” and an “opportunity for DRX (Opportunity for DRX)”. In the “on duration”, the terminal device listens to and receives data on a physical downlink control channel (physical downlink control channel, PDCCH). The on duration is the active time of the C-DRX of the terminal device, and correspondingly, the opportunity for DRX is a dormant time.

However, in an existing transmission mechanism, the terminal device receives data scheduling in the active time, and does not receive data scheduling in the dormant time. Therefore, the terminal device can perform BWP switching only in the active time. Currently, it is proposed that before the active time of the C-DRX, the network device sends indication information to indicate the terminal device to perform BWP switching. However, because the terminal device cannot receive data scheduling beyond the active time, it is proposed that the currently introduced power consumption reduction signal is used to carry BWP switching information. However, in this way, because the power consumption reduction signal does not carry data scheduling information, an effective time of the BWP switching needs to be urgently determined.

SUMMARY

This application provides a communication method and an apparatus, to indicate an effective time of BWP switching.

According to a first aspect, this application provides a communication method. The method may include: A network device determines first information, and sends the first information to a terminal device at a first moment, where the first information is used to indicate bandwidth part BWP switching and indicate a start moment at which the terminal device works on a BWP occupied after the switching, and the start moment is a start moment of on duration on duration in a discontinuous reception DRX cycle. The terminal device performs the BWP switching based on the first information, and works, at the start moment, on the BWP occupied after the switching, where the first moment is before the on duration.

According to the foregoing method, an effective time of the BWP switching can be indicated in the first information. In this way, the start moment at which the terminal device works on the BWP occupied after the switching can be determined.

In a possible design, a time interval between the first moment and the start moment of the on duration is greater than specified duration, and the specified duration is greater than or equal to duration for performing the BWP switching by the terminal device. In this way, the moment at which the network device sends the first information can be specified, to ensure that the terminal device completes the BWP switching before the on duration.

In a possible design, the first information is further used to indicate the terminal device to complete the BWP switching before the on duration. In this way, the terminal device may be explicitly indicated to complete the BWP switching before the on duration, so that the terminal device accurately works, at the start moment of the on duration, on the BWP occupied after the switching.

According to a second aspect, this application provides a communication method. The method may include:

A network device determines BWP switching indication information, and sends the BWP switching indication information to a terminal device in a slot n, where the BWP switching indication information includes a first value and a minimum value of a first slot difference, and the first slot difference is an interval between a slot in which first data is transmitted and the slot n. The terminal device determines a first target slot based on the first value of the first slot difference and the slot n, and starts to use the minimum value of the first slot difference in a start position of the first target slot. In this way, an effective time of a minimum value of K0 or K2 may be determined while BWP switching and the minimum value of K0 or K2 are indicated. When the first data is downlink data, the first slot difference is K0, and when the first data is uplink data, the first slot difference is K2. Therefore, if an effective time of the minimum value of the first slot difference is determined, an effective time of the minimum value of K0 or K2 can be determined.

In a possible design, the BWP switching indication information further includes a minimum value of a second slot difference, and the second slot difference is an interval between a slot in which second data is transmitted and the slot n. The terminal device determines a second target slot based on the first value of the first slot difference, the slot n, a first BWP, and a second BWP, where the first BWP is a BWP occupied after the terminal device performs the BWP switching based on the BWP switching indication information, and the second BWP is a BWP occupied after the terminal device performs the BWP switching based on the BWP switching indication information, or the second BWP is a BWP occupied before the terminal device performs the BWP switching based on the BWP switching indication information. The terminal device starts to use a minimum value of the second slot difference in a start position of the second target slot. In this way, effective times of minimum values of K0 and K2 may be determined while the BWP switching and the minimum values of K0 and K2 are indicated. When the first data is downlink data and the second data is uplink data, the first slot difference is K0, and the second slot difference is K2. When the first data is uplink data and the second data is downlink data, the first slot difference is K2, and the second slot difference is K0. Therefore, if the effective time of the minimum value of the first slot difference and an effective time of the minimum value of the second slot difference are determined, the effective times of the minimum values of K0 and K2 can be determined.

In a possible design, when the first data may be downlink data, the terminal device may determine the first target slot based on the first value of the first slot difference and the slot n according to the following formula:

$$A = \left\lfloor n \cdot \frac{2^{\mu_{PDSCH}}}{2^{\mu_{PDCCH}}} \right\rfloor + X,$$

where

A is an index value of the first target slot, X is the first value of the first slot difference, $\mu_{PDSCH}$ is a numerology (numerology) of a BWP on which the first data is located, and $\mu_{PDCCH}$ is a numerology of a BWP on which the switching indication information is located.

According to the foregoing method, the first target slot can be accurately determined, so that the effective time of the minimum value of K0 can be determined.

In a possible design, when the first data may be downlink data, and the second data may be uplink data, the terminal device may determine the second target slot based on the first value of the first slot difference, the slot n, the first BWP, and the second BWP according to the following formula:

$$B = \left\lceil \left( \left\lfloor n \cdot \frac{2^{\mu_{PDSCH}}}{2^{\mu_{PDCCH}}} \right\rfloor + X \right) \cdot \frac{2^{\mu_{UL,BWP}}}{2^{\mu_{DL,BWP}}} \right\rceil,$$

where

B is an index value of the second target slot, X is the first value of the first slot difference, $\mu_{PDSCH}$ is a numerology of a BWP on which the first data is located, $\mu_{PDCCH}$ is a numerology of a BWP on which the switching indication information is located, $\mu_{DL,BWP}$ is a numerology of the first BWP, the first BWP is a downlink BWP, $\mu_{UL,BWP}$ is a numerology of the second BWP, and the second BWP is an uplink BWP.

According to the foregoing method, the second target slot can be accurately determined, so that the effective time of the minimum value of K2 can be determined.

In a possible design, when the first data is uplink data, the terminal device may determine the first target slot based on the first value of the first slot difference and the slot n according to the following formula:

$$A = \left\lfloor n \cdot \frac{2^{\mu_{PUSCH}}}{2^{\mu_{PDCCH}}} \right\rfloor + X,$$

where

A is an index value of the first target slot, X is the first value of the first slot difference, $\mu_{PUSCH}$ is a numerology of a BWP on which the first data is located, and $\mu_{PDCCH}$ is a numerology of a BWP on which the switching indication information is located.

According to the foregoing method, the first target slot can be accurately determined, so that the effective time of the minimum value of K2 can be determined.

In a possible design, when the first data is downlink data, and the second data is uplink data, the terminal device may determine the second target slot based on the first value of the first slot difference, the slot n, the first BWP, and the second BWP according to the following formula:

$$B = \left\lceil \left( \left\lfloor n \cdot \frac{2^{\mu_{PUSCH}}}{2^{\mu_{PDCCH}}} \right\rfloor + X \right) \cdot \frac{2^{\mu_{DL,BWP}}}{2^{\mu_{UL,BWP}}} \right\rceil,$$

where

B is an index value of the second target slot, X is the first value of the first slot difference, $\mu_{PDSCH}$ is a numerology of a BWP on which the first data is located, $\mu_{PDCCH}$ is a numerology of a BWP on which the switching indication information is located, $\mu_{UL,BWP}$ is a numerology of the first BWP, the first BWP is an uplink BWP, $\mu_{DL,BWP}$ is a numerology of the second BWP, and the second BWP is a downlink BWP.

According to the foregoing method, the second target slot can be accurately determined, so that the effective time of the minimum value of K0 can be determined.

According to a third aspect, this application further provides a network device. The network device has functions of implementing the network device in the method example of the first aspect or the second aspect. The functions may be implemented by hardware, or may be implemented by hardware executing corresponding software. The hardware or software includes one or more modules corresponding to the functions.

In a possible design, a structure of the network device includes a processing unit and a transceiver unit. These units can execute corresponding functions in the method example. For details, refer to detailed descriptions in the method example. Details are not described herein again.

In a possible design, the structure of the network device includes a transceiver and a processor, and optionally, may further include a memory. The transceiver is configured to receive and send data, and communicate and interact with another device in a system. The processor is configured to support the network device in performing a corresponding function of the network device in the method according to first aspect or the second aspect. The memory is coupled to the processor, and the memory stores a program instruction and data that are necessary for the network device.

According to a fourth aspect, this application further provides a terminal device. The terminal device has functions of implementing the terminal device in the method example of the first aspect or the second aspect. The functions may be implemented by hardware, or may be implemented by hardware executing corresponding software. The hardware or software includes one or more modules corresponding to the functions.

In a possible design, a structure of the terminal device includes a processing unit and a transceiver unit. These units can execute corresponding functions in the method example. For details, refer to detailed descriptions in the method example. Details are not described herein again.

In a possible design, the structure of the terminal device includes a transceiver and a processor, and optionally, may further include a memory. The transceiver is configured to receive and send data, and communicate and interact with another device in a system. The processor is configured to support the terminal device in performing a corresponding function of the terminal device in the method according to first aspect or the second aspect. The memory is coupled to the processor, and the memory stores a program instruction and data that are necessary for the terminal device.

According to a fifth aspect, this application further provides a communications system. The communications system includes at least one terminal device and at least one network device that are described in the foregoing designs. Further, the network device in the communications system may perform any method performed by the network device in the foregoing methods, and the terminal device in the communications system may perform any method performed by the terminal device in the foregoing methods.

According to a sixth aspect, this application provides a computer storage medium. The computer storage medium stores a computer executable instruction, and when the computer executable instruction is invoked by a computer, the computer is enabled to perform any one of the foregoing methods.

According to a seventh aspect, this application provides a computer program product including an instruction. When the computer program product is run on a computer, the computer is enabled to perform any one of the foregoing methods.

According to an eighth aspect, this application provides a chip. The chip is coupled to a memory, and is configured to read and execute a program instruction stored in the memory, to implement any one of the foregoing methods.

DESCRIPTION OF EMBODIMENTS

The following further describes this application in detail with reference to accompanying drawings.

This application provides a communication method and an apparatus, to indicate an effective time of BWP switching. The method and the apparatus of this application are based on a same technical concept. The method and the apparatus have similar principles for resolving problems. Therefore, for implementation of the apparatus and the method, refer to each other, and details of repeated parts are not described again.

In the descriptions of this application, terms such as "first" and "second" are merely used for distinction and description, and should not be understood as an indication or implication of relative importance or an indication or implication of an order.

To describe the technical solutions in the embodiments of this application more clearly, the following describes the communication method and the apparatus according to the embodiments of this application in detail with reference to accompanying drawings.

Figure 1:
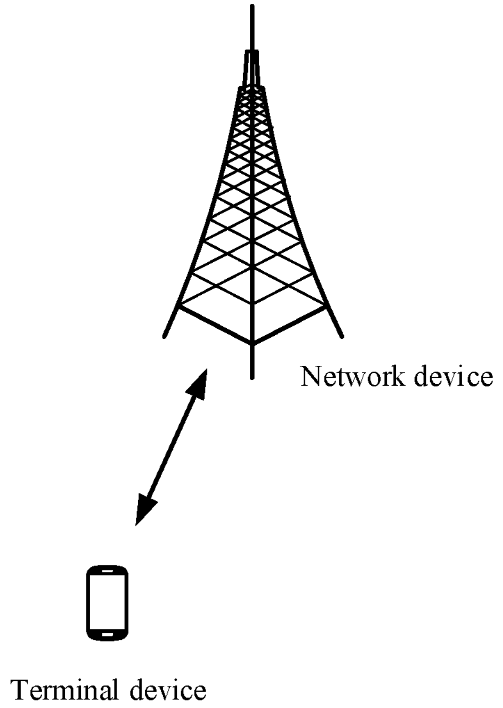
FIG. 1 is a schematic structural diagram of a communications system according to this application.

FIG. 1 shows an architecture of a possible communications system applicable to a communication method according to an embodiment of this application. The architecture of the communications system includes a network device and a terminal device.

The network device is a device that has a wireless transceiver function or a chip that can be disposed in the network device. The network device includes but is not limited to a gNB, a radio network controller (radio network controller, RNC), a NodeB (NodeB, NB), a base station controller (base station controller, BSC), a base transceiver station (base transceiver station, BTS), a home evolved NodeB (for example, a home evolved NodeB, or a home NodeB, HNB), a baseband unit (baseband unit, BBU), an access point (access point, AP) in a wireless fidelity (wireless fidelity, WIFI) system, a wireless relay node, a wireless backhaul node, a transmission and reception point (transmission and reception point, TRP, or transmission point, TP). The network device may alternatively be a network node that constitutes a gNB or a transmission point, for example, a baseband unit (BBU), or a distributed unit (distributed unit, DU).

In some embodiments, the gNB may include a centralized unit (centralized unit, CU) and a DU. The gNB may further include a radio unit (radio unit, RU). The CU implements some functions of the gNB, and the DU implements some functions of the gNB. For example, the CU implements functions of a radio resource control (radio resource control, RRC) layer and a packet data convergence protocol (packet data convergence protocol, PDCP) layer, and the DU implements functions of a radio link control (radio link control, RLC) layer, a media access control (media access control, MAC) layer, and a physical (physical, PHY) layer. Information at the RRC layer is eventually converted into information at the PHY layer, or is converted from information at the PHY layer. Therefore, in this architecture, higher layer signaling such as RRC layer signaling or PHCP layer signaling may also be considered as being sent by the DU or by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

The terminal device may be referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone (mobile phone), a tablet computer (Pad), a computer having a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. In this application, a terminal device having a wireless transceiver function and a chip that can be disposed in the terminal device are collectively referred to as a terminal device.

It should be noted that the communications system shown in FIG. 1 may be but is not limited to a 5th generation (5th Generation, 5G) system, for example, a new radio access technology (new radio access technology, NR). Optionally, the method in the embodiments of this application is further applicable to various future communications systems, for example, a 6G system or another communications network.

To facilitate understanding of the embodiments of this application, the following first describes concepts and basic knowledge related to the embodiments of this application.

Figure 2:
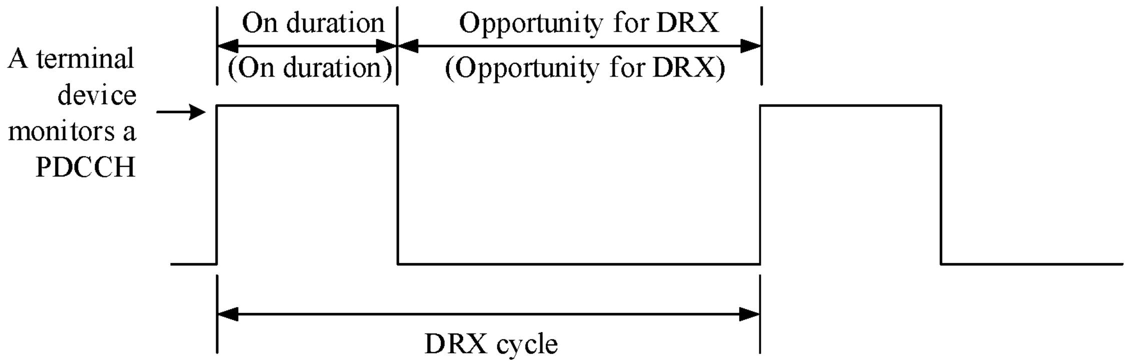
FIG. 2 is a schematic diagram of a DRX cycle according to this application.

(1) DRX cycle, which may include "on duration" and an "opportunity for DRX" shown in FIG. 2. A terminal device listens to and receives a PDCCH within the "on duration", and the "on duration" may be considered as an active time. Within the "opportunity for DRX", the terminal device may not listen to or receive the PDCCH, and this reduces power consumption. The opportunity for DRX may be considered as a dormant time. It should be noted that, that the terminal device receives the PDCCH means that the terminal device receives DCI carried on the PDCCH.

(2) Scheduling manner of a network device in an NR release 15

When the network device schedules a terminal device to receive downlink data, or when the network device schedules a terminal device to send uplink data, the network device first sends scheduling information (PDCCH). The scheduling information indicates transmission parameters of a PDSCH (downlink data) or a physical uplink shared channel (physical uplink shared channel, PUSCH) (uplink data). These transmission parameters include a time domain resource position of the PDSCH/PUSCH.

Specifically, the time domain resource position includes a slot in which the PDSCH/PUSCH is located, and a start position and a length of a symbol occupied by the PDSCH/PUSCH in the slot.

In terms of a process, in an example of a downlink, the network device first configures a time domain resource allocation (time domain resource allocation, TDRA) table for the terminal device. This table can be divided into 4 columns. The first column is an index (index), and the index is used to index other parameters in a row. The second column is K0 (or K2 in an uplink). The value indicates a slot difference between a slot in which the PDCCH is located and a slot in which the PDSCH is located. For example, K0=0 indicates that the PDCCH and the PDSCH are in a same slot, and K0=1 indicates that the PDSCH is in a next slot of the PDCCH. The third column is a starting and length indication value (starting and length indication value, SLIV). The value indicates a start symbol and a symbol length that are of a symbol occupied by the PDSCH in a slot. The value is jointly encoded. If S represents a sequence number of the start symbol, and L represents the symbol length, the SLIV is obtained by using S and L according to a rule. The fourth column is a mapping type (mapping type), including a mapping type A and a mapping type B.

For example, Table 1 is a downlink TDRA table, and Table 2 is an uplink TDRA table.

TABLE 1

| Index | K0 | SLIV | Mapping type |
|---|---|---|---|
| 0 | 0 | 66 | A |
| 1 | 1 | 27 | B |
| 2 | 1 | 101 | B |

TABLE 2

| Index | K2 | SLIV | Mapping type |
|---|---|---|---|
| 0 | 2 | 27 | B |
| 1 | 2 | 91 | B |

After the network device configures the TDRA table for the terminal device, when scheduling data transmission, the network device indicates an index on the PDCCH, and the terminal device may obtain a time domain resource position through table lookup based on the index and the configured table. Then, the terminal device receives/sends data in the determined position.

In the foregoing scheduling manner, if the PDCCH and the PDSCH (or PUSCH) are in a same slot, it is referred to as intra-slot scheduling (corresponding to a case in which K0=0 or K2=0). If the PDCCH and the PDSCH (or PUSCH) are in different slots, it is referred to as cross-slot scheduling (corresponding to a case in which K0>0 or K2>0). It is clearly that the cross-slot scheduling causes a larger transmission delay.

Before the terminal device successfully decodes the PDCCH, the terminal device does not know the index indicated in the PDCCH. In an example of a downlink, if the TDRA table configured by the network device for the terminal device includes both a case in which K0=0 and a case in which K0>0, before decoding the PDCCH, the terminal device does not know whether current scheduling is an intra-slot scheduling or a cross-slot scheduling.

(3) BWP: 5G NR supports a concept of the BWP, to be specific, supports transmission between a network device and a terminal device by occupying a bandwidth part. A 5G system bandwidth (the system bandwidth herein is a bandwidth of a carrier, and corresponds to a bandwidth of each carrier component (carrier component, CC) in a carrier aggregation (carrier aggregation, CA) scenario or a dual connectivity (dual connectivity, DC) scenario) may be very large, for example, 200 MHz or 400 MHz, and some terminal devices cannot support such a large bandwidth. Therefore, the network device may configure a BWP (a part of the system bandwidth) for the terminal device, for example, 20 MHz. The terminal device may communicate with the network device on the BWP of 20 MHz.

Both a frequency division duplexing (frequency division duplexing, FDD) system and a time division duplexing (time division duplexing, TDD) system support the BWP. The BWP may be classified into a downlink BWP (downlink BWP, DL BWP) and an uplink BWP (uplink BWP, UL BWP). The network device may configure a plurality of DL BWPs and a plurality of UL BWPs for the terminal device, and activate at least one DL BWP and at least one UL BWP. The terminal device receives, on an active DL BWP (namely, the active DL BWP), a downlink signal sent by the network device. The downlink signal includes but is not limited to downlink control signaling and downlink data. The terminal device sends an uplink signal on an active UL BWP. The uplink signal includes but is not limited to uplink control signaling, uplink data, a scheduling request (scheduling request, SR), a sounding reference signal (sounding reference signal, SRS), and channel state information (channel state information, CSI)/channel quality indicator (channel quality indicator, CQI) feedback.

Parameters of the BWP include a numerology (translated as a system parameter or a parameter set), and are parameters such as a subcarrier spacing, a symbol length corresponding to the subcarrier spacing, and a cyclic prefix (cyclic prefix, CP) length.

In an existing standard, when the terminal device works in one cell, there is only one active DL BWP and one active UL BWP. However, an active BWP may be changed, and this is referred to as BWP switching. For example, the network device configures two DL BWPs for the terminal device: a DL BWP1 and a DL BWP2. A DL BWP activated by the terminal device is the DL BWP1. In this case, the network device may send a BWP switching indication (the switching indication is a PDCCH), to switch from the DL BWP of the terminal device to the DL BWP2. Likewise, the network device may also indicate, by using the PDCCH, to switch an UL BWP activated by the terminal device.

In the TDD system, the DL BWP and the UL BWP of the terminal device are always switched in pairs. To be specific, once the DL BWP is switched, the UL BWP is also automatically switched to a pre-paired UL BWP. However, in the FDD system, DL BWP switching of the terminal device is decoupled from UL BWP switching of the UE.

(4) Cross-slot scheduling in a topic of power consumption reduction in NR Rel-16

Standby time of the terminal device is an important part that affects user experience. A 5G NR system needs to support a larger bandwidth, a higher transmission rate, and a wider coverage area than a 4G long term evolution (long term evolution, LTE) system. Therefore, power consumption of an NR terminal device is higher than power consumption of an LTE terminal device. To ensure good user experience, the 3rd generation partnership project (3rd generation partnership project, 3GPP) initiates a topic of power consumption reduction of the terminal device in the Rel-16, and studies an optimization solution for reducing power consumption of the terminal device.

Figure 3:
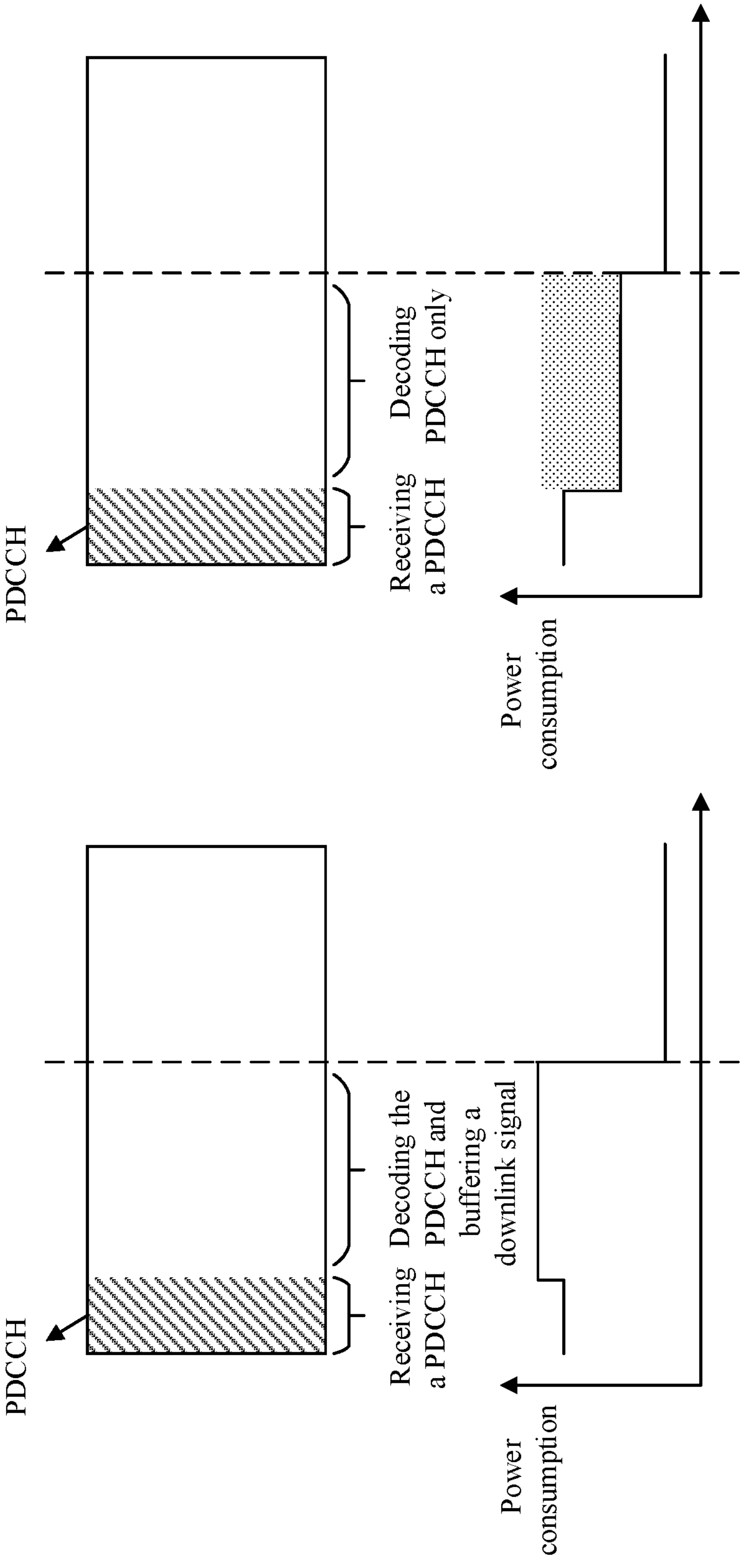
FIG. 3 is a schematic diagram of data scheduling according to this application.

In the topic of power consumption reduction in NR, a company proposes that the scheduling manner in (2) is not conducive to energy saving of the terminal device. As shown on the left of FIG. 3, if the terminal device does not know whether intra-slot scheduling exists in a current slot (as long as a TDRA table configured by the network device includes K0=0, the intra-slot scheduling may exist), to avoid a signal loss, a downlink signal needs to be buffered when the terminal device decodes a PDCCH after receiving the PDCCH. As shown on the right of FIG. 3, if the terminal device can know in advance that no scheduling exists in the current slot, in a process in which the terminal device decodes the PDCCH after receiving the PDCCH, the terminal device may safely disable a radio frequency module, and does not buffer any signal. In this way, an energy saving effect can be achieved (a shadow part in the lower right corner of FIG. 3 is saved energy).

To reduce power consumption, in a discussion process of an existing standard, it has been agreed that the network device indicates a “minimum available value of K0” and/or a “minimum available value of K2” to the terminal device by using a power consumption reduction signal. After receiving the indication, the terminal device considers that when the network device schedules data of the terminal device, a K0/K2 value less than the “minimum value” is not indicated. In an example of a downlink, when the TDRA table configured by the network device for the terminal device is shown in Table 3, if the network device further indicates that the “minimum value of K0” is 1, the network device indicates only two rows of index=1 and index=2 in scheduling information when scheduling the terminal device, and does not indicate a row of index=0.

TABLE 3

| Index | K0 | SLIV | Mapping type |
|---|---|---|---|
| 0 | 0 | 66 | A |
| 1 | 1 | 27 | B |
| 2 | 1 | 101 | B |

Currently, to reduce power consumption of the terminal device, some researches indicate that the currently introduced power consumption reduction signal may be used to carry BWP switching information. However, in this way, the power consumption reduction signal does not carry data scheduling information, and an effective time of BWP switching is not clear. Based on this, this application provides a communication method, to indicate the effective time of the BWP switching. The following describes in detail the communication method provided in this application with reference to specific embodiments.

Figure 4:
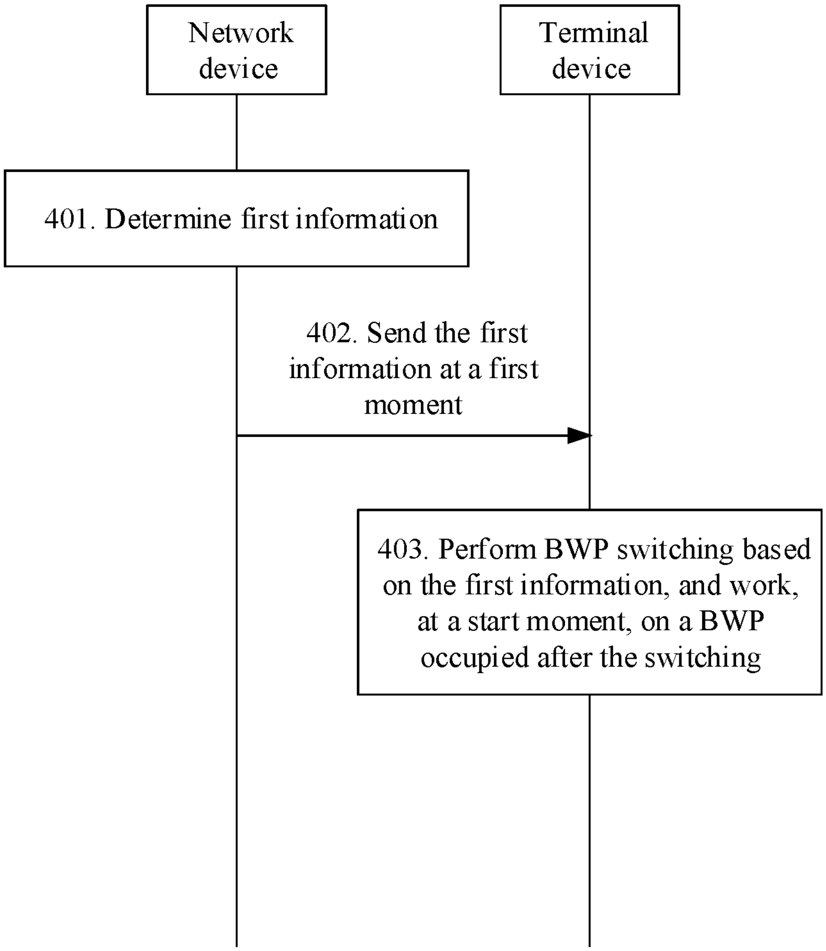
FIG. 4 is a flowchart of a communication method according to this application.

A communication method provided in an embodiment of this application is applicable to the communications system shown in FIG. 1. Referring to FIG. 4, a specific procedure of the method may include the following steps:

Step 401: A network device determines first information, where the first information is used to indicate BWP switching and indicate a start moment at which a terminal device works on a BWP occupied after the switching, and the start moment is a start moment of on duration in a DRX cycle.

Step 402: The network device sends the first information to the terminal device at a first moment, where the first moment is before the on duration.

Step 403: The terminal device performs the BWP switching based on the first information, and works, at the start moment, on the BWP occupied after the switching.

In an implementation, it may be predefined (or considered by default) that when sending the first information to the terminal device, the network device reserves sufficient time for the terminal device to perform the BWP switching. To be specific, it is predefined that a time interval between the first moment and the start moment of the on duration is greater than specified duration, and the specified duration is greater than or equal to duration for performing the BWP switching by the terminal device. In this implementation, the network device ensures that the time interval between the first moment and the start moment of the on duration is large enough, to ensure the time required by the terminal device to perform the BWP switching.

In another implementation, the network device may explicitly indicate that the time interval between the first moment and the start moment of the on duration is greater than the specified duration, and the specified duration is greater than or equal to the duration for performing the BWP switching by the terminal device. In this way, the terminal device can switch to a new BWP at the start moment of the on duration. In this case, the terminal device naturally works on the new BWP (to be specific, the BWP occupied after the switching) within the on duration.

In an optional implementation, when the network device may explicitly indicate, by using the first information, that the time interval between the first moment and the start moment of the on duration is greater than the specified duration, and the specified duration is greater than or equal to the duration for performing the BWP switching by the terminal device. For example, the first information is further used to indicate the terminal device to complete the BWP switching before the on duration. In this way, the first information is used to explicitly indicate the terminal device to complete the BWP switching before the on duration. It indicates that the time interval between the first moment and the start moment of the on duration is not less than the duration for performing the BWP switching by the terminal device.

Specifically, that the terminal device performs the BWP switching based on the first information may be: The terminal device completes the BWP switching based on the first information before the on duration.

Figure 5:
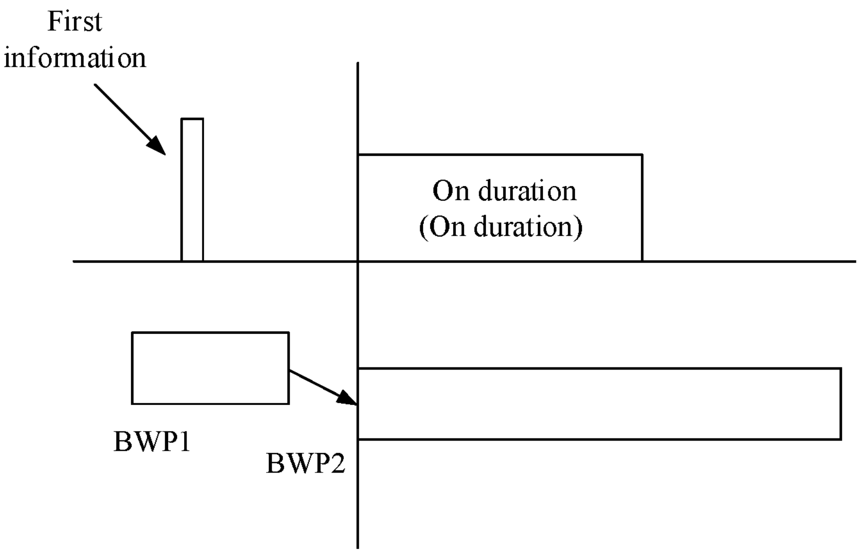
FIG. 5 is a schematic diagram of receiving first information by a terminal device according to this application.

For example, FIG. 5 is a schematic diagram of receiving the first information by the terminal device. The terminal device can start to work, at the start moment of the on duration, on the BWP occupied after the switching, to be specific, can receive or send data on the BWP occupied after the switching.

According to the communication method provided in this embodiment of this application, the network device determines the first information, and sends the first information to the terminal device at the first moment, where the first information is used to indicate the bandwidth part BWP switching and indicate the start moment at which the terminal device works on the BWP occupied after the switching, and the start moment is the start moment of on duration on duration in a discontinuous reception DRX cycle. The terminal device performs the BWP switching based on the first information, and works, at the start moment, on the BWP occupied after the switching, where the first moment is before the on duration. According to the foregoing method, an effective time of the BWP switching can be indicated when the first information does not include data scheduling information. In this way, the start moment at which the terminal device works on the BWP occupied after the switching can be determined.

Currently, time required for works that needs to be completed when the terminal device performs the BWP switching includes: time for decoding DCI (to be specific, indication information for the BWP switching) by the terminal device, time for adjusting a radio frequency circuit and a baseband circuit by the terminal device, time required for mapping a new BWP and time required by the terminal device to apply a parameter on the new BWP. To be specific, finally, the effective time of the BWP switching cannot be earlier than a start time of any one of the foregoing four time periods. If only DCI decoding is considered, it is clearly improper to consider that a new minimum value of K0/K2 can take effect after the DCI is decoded. The terminal device has not switched to the new BWP at this time, and cannot apply the parameter on the new BWP.

In addition, an existing standard specifies that the effective time of the BWP switching is a start of a slot (slot) in which data scheduled by switching DCI is located. In a switching process, the terminal device does not receive or send any signal. Therefore, even if an effective time for the new minimum value of K0/K2 is defined earlier than the effective time of the BWP switching, the terminal device does not actually use these values. For example, time required by the terminal device to complete the foregoing four actions is 2 slots. However, the terminal device receives, in a slot n, downlink data scheduled by the network device in a slot n+4. In this case, the terminal device uses a start moment of the slot n+4 as the effective time of the new BWP, and the terminal device receives scheduling only after the effective time. It is meaningless for the terminal device to start to use the new minimum value of K0/K2 in a slot n+2.

Therefore, in an active time (active time) of the DRX cycle, when the network device indicates both the BWP switching and the minimum value of K0/K2 in a same piece of DCI, the effective time of the new minimum value of K0/K2 may need to be later. Therefore, the effective time of the new minimum value of K0/K2 needs to be redefined.

Based on this, this application provides another communication method, to indicate the effective time of the minimum value of K0/K2. The following describes in detail the communication method provided in this application with reference to specific embodiments.

Figure 6:
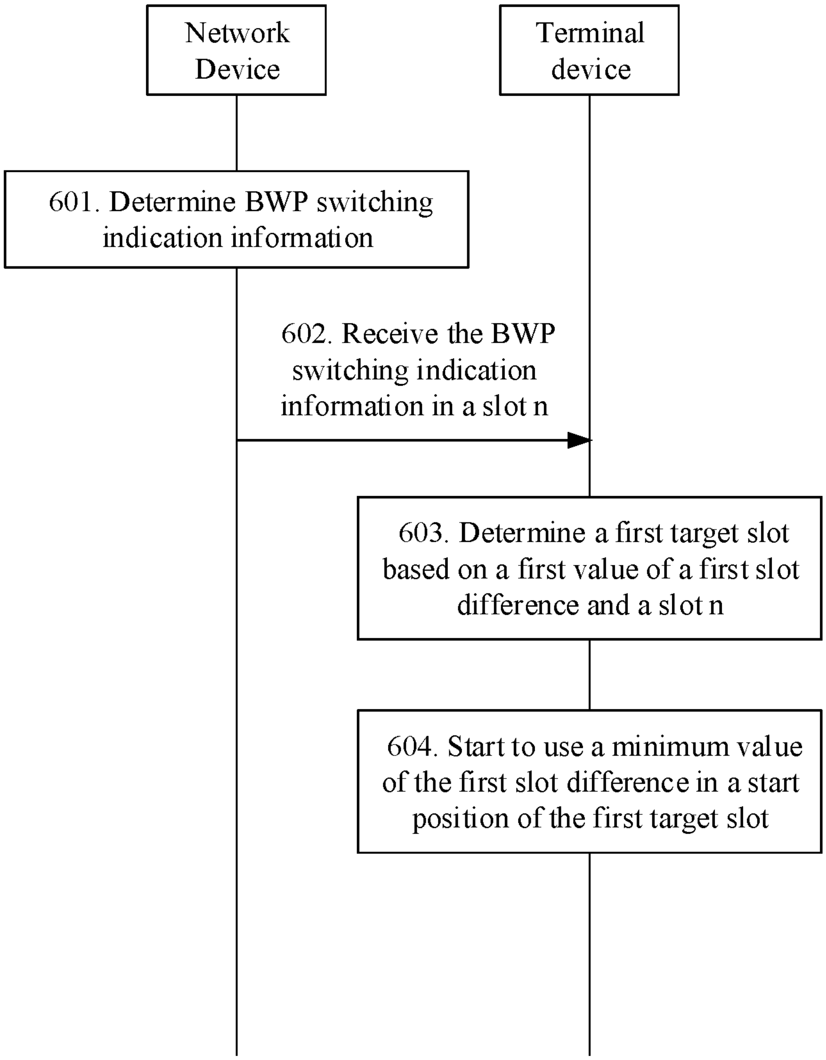
FIG. 6 is a flowchart of another communication method according to this application.

Another communication method provided in an embodiment of this application is applicable to the communications system shown in FIG. 1. Referring to FIG. 6, a specific procedure of the method may include the following steps:

Step 601: A network device determines BWP switching indication information, where the BWP switching indication information includes a first value and a minimum value of a first slot difference, and the first slot difference is an interval between a slot in which first data is transmitted and a slot n.

Step 602: A terminal device receives the BWP switching indication information from the network device in the slot n.

Step 603: The terminal device determines a first target slot based on a first value of the first slot difference and the slot n.

Step 604: The terminal device starts to use a minimum value of the first slot difference in a start position of the first target slot.

The BWP switching indication information may be DCI.

In an optical implementation, the BWP switching indication further includes a minimum value of a second slot difference. The second slot difference is an interval between a slot in which second data is transmitted and the slot n. The terminal device needs to perform the following operation: The terminal device determines a second target slot based on the first value of the first slot difference, the slot n, a first BWP, and a second BWP. The first BWP is a BWP occupied after the terminal device performs BWP switching based on the BWP switching indication information, and the second BWP is a BWP occupied after the terminal device performs the BWP switching based on the BWP switching indication information, or the second BWP is a BWP occupied before the terminal device performs the BWP switching based on the BWP switching indication information. The terminal device starts to use the minimum value of the second slot difference in a start position of the second target slot.

In a specific implementation, the first data may be downlink data (PDSCH data), or may be uplink data (PUSCH data). Correspondingly, when the first data is downlink data, the first slot difference is K0, and when the first data is uplink data, the first slot difference is K2. Further, when the first data is downlink data and the second data is uplink data, the second slot difference is K2; and when the first data is uplink data and the second data is downlink data, the second slot difference is K0.

In an example, when the first data is downlink data, the terminal device may determine the first target slot based on the first value of the first slot difference and the slot n according to the following formula 1:

$$A=\left\lfloor n\cdot\frac{2^{\mu_{PDSCH}}}{2^{\mu_{PDCCH}}}\right\rfloor+X \quad \text{formula 1}$$

A is an index value of the first target slot, X is the first value of the first slot difference, $\mu_{PDSCH}$ is a numerology (numerology) of a BWP on which the first data is located, and $\mu_{PDCCH}$ is a numerology of a BWP on which the switching indication information is located.

Further, when the first data is downlink data, and the second data is uplink data, the terminal device may determine the second target slot based on the first value of the first slot difference, the slot n, the first BWP, and the second BWP according to the following formula 2:

$$B=\left\lceil\left(\left\lfloor n\cdot\frac{2^{\mu_{PDSCH}}}{2^{\mu_{PDCCH}}}\right\rfloor+X\right)\cdot\frac{2^{\mu_{UL,BWP}}}{2^{\mu_{DL,BWP}}}\right\rceil \quad \text{formula 2}$$

B is an index value of the second target slot, X is the first value of the first slot difference, $\mu_{PDSCH}$ is a numerology of a BWP on which the first data is located, $\mu_{PDCCH}$ is a numerology of a BWP on which the switching indication information is located, $\mu_{DL,BWP}$ is a numerology of the first BWP, the first BWP is a downlink BWP, $\mu_{UL,BWP}$ is a numerology of the second BWP, and the second BWP is an uplink BWP. Herein, to be specific, the first BWP is a downlink BWP occupied after the switching, and the second BWP is an uplink BWP occupied after the switching or the second BWP is a current uplink BWP (an uplink BWP occupied before the switching).

It should be noted that, if a current system is a TDD system, a DL BWP and a UL BWP are simultaneously switched. In this case, the second BWP is the uplink BWP occupied after the switching. If a current system is an FDD system, when a DL BWP is switched, a UL BWP is not switched. In this case, the second BWP is the current uplink BWP.

Figure 7:
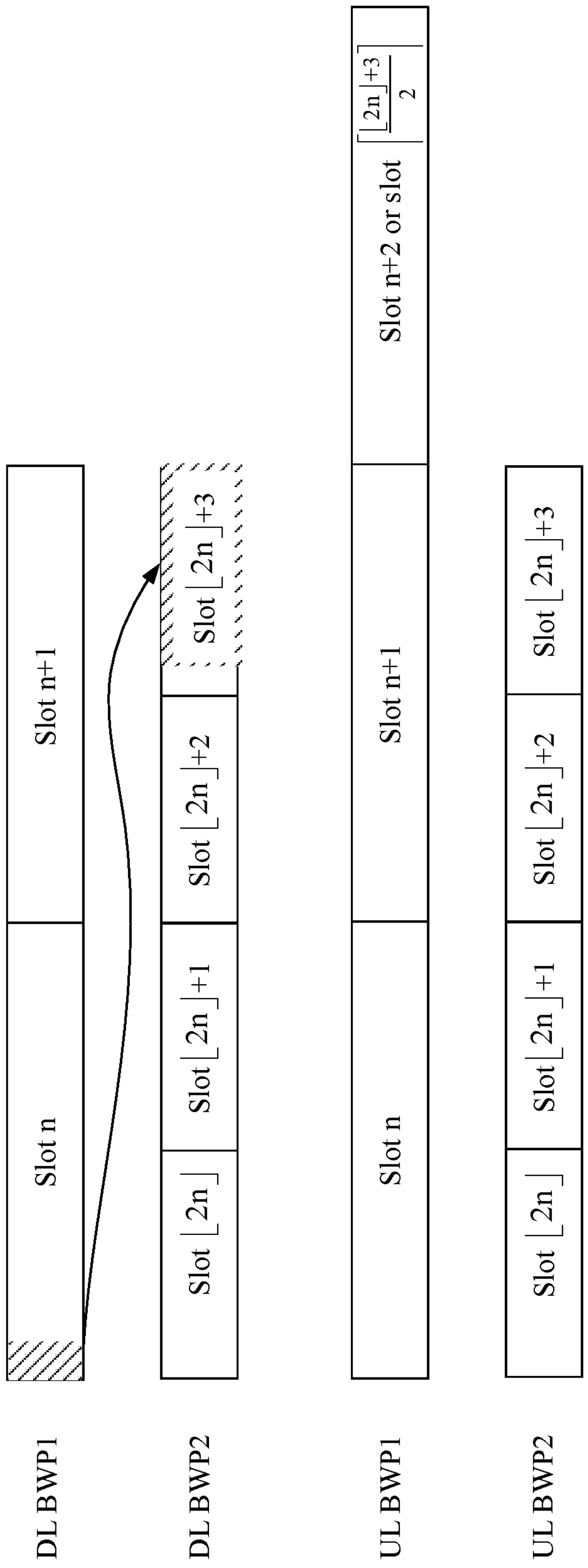
FIG. 7 is a schematic diagram of an effective time of a minimum value of a first slot difference according to this application.

For example, FIG. 7 is a schematic diagram of the effective time of the minimum value of the first slot difference. In FIG. 7, the terminal device works in the FDD system, to be specific, the DL BWP and the UL BWP are separately switched. The first slot difference is K0, and the second slot difference is K2. The terminal device receives a BWP switching indication in the slot n, to indicate to switch the DL BWP to a DL BWP2, where a value X of K0 indicated in the BWP switching indication is equal to 3. In addition, the indication further indicates a new minimum value of K0. Therefore, as shown in FIG. 7, according to the formula 1, the new minimum value of K0 starts to take effect from a start position of a slot $\lfloor 2n\rfloor+3$ on the DL BWP2 for the terminal device. If the indication further indicates a new minimum value of K2, according to the formula 2, the new minimum value of K2 starts to take effect from a start position of a slot $$\frac{\lfloor 2n\rfloor+3}{2}$$

on the UL BWP1 for the terminal device.

In another example, when the first data is uplink data, the terminal device may determine the first target slot based on the first value of the first slot difference and the slot n according to the following formula 3:

$$A=\left\lfloor n\cdot\frac{2^{\mu_{PUSCH}}}{2^{\mu_{PDCCH}}}\right\rfloor+X \quad \text{formula 3}$$

A is an index value of the first target slot, X is the first value of the first slot difference, $\mu_{PUSCH}$ is a numerology of a BWP on which the first data is located, and $\mu_{PDCCH}$ is a numerology of a BWP on which the switching indication information is located.

Further, when the first data is downlink data, and the second data is uplink data, the terminal device may determine the second target slot based on the first value of the first slot difference, the slot n, the first BWP, and the second BWP according to the following formula 4:

$$B=\left\lceil\left(\left\lfloor n\cdot\frac{2^{\mu_{PUSCH}}}{2^{\mu_{PDCCH}}}\right\rfloor+X\right)\cdot\frac{2^{\mu_{DL,BWP}}}{2^{\mu_{UL,BWP}}}\right\rceil \quad \text{formula 4}$$

B is an index value of the second target slot, X is the first value of the first slot difference, $\mu_{PDSCH}$ is a numerology of a BWP on which the first data is located, $\mu_{PDCCH}$ is a numerology of a BWP on which the switching indication information is located, $\mu_{UL,BWP}$ is a numerology of the first BWP, the first BWP is an uplink BWP, $\mu_{DL,BWP}$ is a numerology of the second BWP, and the second BWP is a downlink BWP. Herein, to be specific, the first BWP is an uplink BWP occupied after the switching, and the second BWP is a downlink BWP occupied after the switching or the second BWP is a current downlink BWP (a downlink BWP occupied before the switching).

It should be noted that, if a current system is a TDD system, a DL BWP and a UL BWP are simultaneously switched. In this case, the second BWP is the downlink BWP occupied after the switching. If a current system is an FDD system, when a DL BWP is switched, a UL BWP is not switched. In this case, the second BWP is the current downlink BWP.

Figure 8:
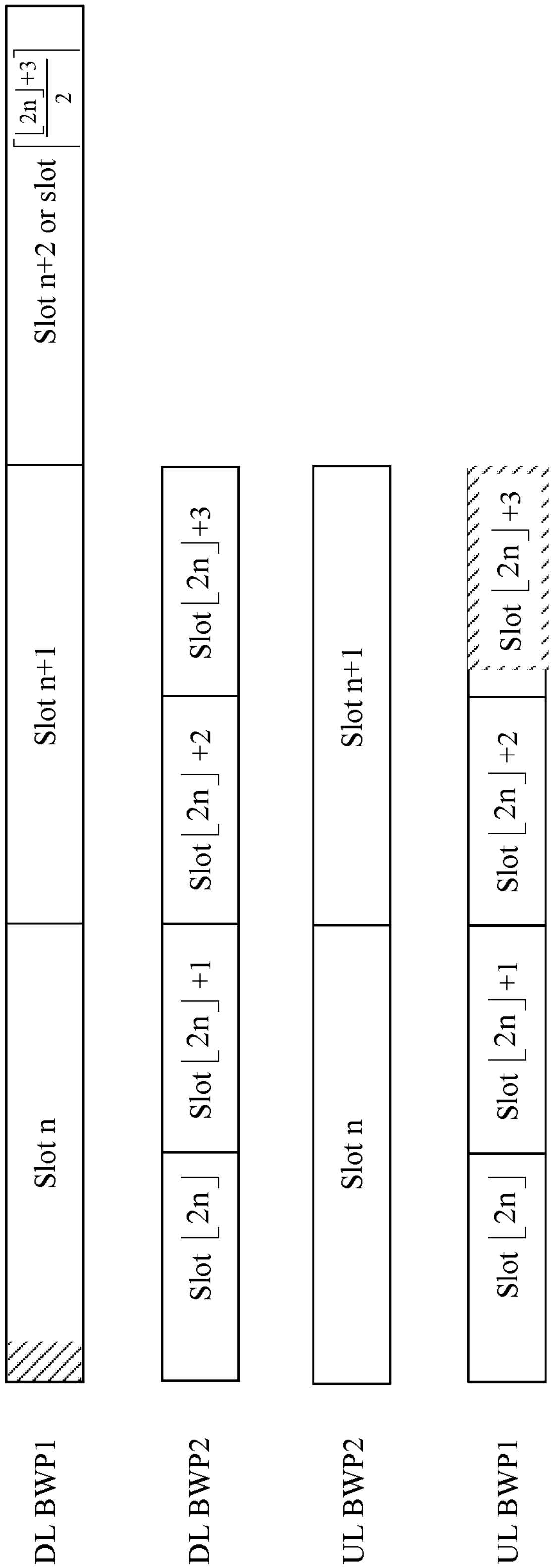
FIG. 8 is a schematic diagram of effective times of minimum values of a first slot difference and a second slot difference according to this application.

For example, FIG. 8 is a schematic diagram of effective times of minimum values of the first slot difference and the second slot difference. In FIG. 8, the terminal device works in the FDD system, to be specific, the DL BWP and the UL BWP are separately switched. The first slot difference is K2, and the second slot difference is K0. The terminal device receives a BWP switching indication in a slot n, to indicate to switch the UL BWP to a UL BWP2, where a value X of K2 indicated in the BWP switching indication is equal to 3. In addition, the indication further indicates a new minimum value of K0 and a new minimum value of K2. Therefore, as shown in FIG. 8, according to the formula 3, the new minimum value of K0 starts to take effect from a start position of a slot $\lfloor 2n \rfloor + 3$ on the UL BWP2 for the terminal device. If the indication further indicates a new minimum value of K2, according to the formula 4, the new minimum value of K0 starts to take effect from a start position of a slot $$\frac{\lfloor 2n \rfloor + 3}{2}$$

on a DL BWP1 for the terminal device.

According to the communication method provided in this embodiment of this application, the network device determines the BWP switching indication information, and sends the BWP switching indication information to the terminal device in the slot n. The BWP switching indication information includes the first value and the minimum value of the first slot difference, and the first slot difference is the interval between the slot in which the first data is transmitted and the slot n. The terminal device determines the first target slot based on the first value of the first slot difference and the slot n, and starts to use the minimum value of the first slot difference in the start position of the first target slot. In this way, the effective time of the minimum value of K0 or K2 may be determined while the BWP switching and the minimum value of K0 or K2 are indicated.

Figure 9:
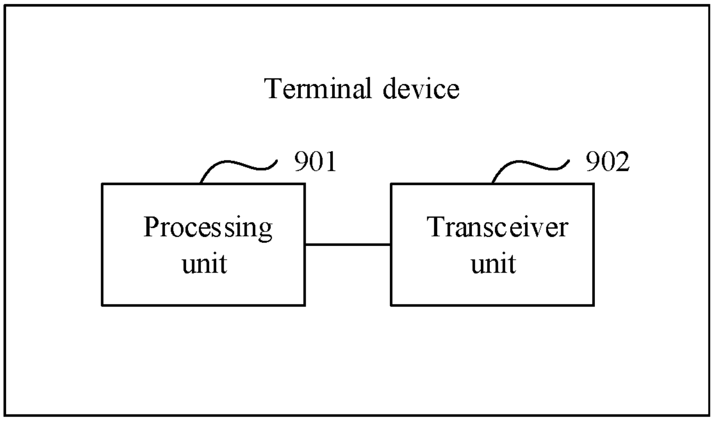
FIG. 9 is a schematic structural diagram of a terminal device according to this application.

Based on the foregoing embodiments, an embodiment of this application further provides a terminal device. The terminal device is applied to the communications system shown in FIG. 1. The terminal device may be configured to implement functions of the terminal device in the communication method shown in FIG. 4 or FIG. 6. Referring to FIG. 9, the terminal device may include a processing unit 901 and a transceiver unit 902.

In an embodiment, that the terminal device implements functions of the terminal device in the communication method shown in FIG. 4 may be specifically:

The transceiver unit 902 is configured to receive first information from a network device at a first moment, where the first information is used to indicate BWP switching and indicate a start moment at which the terminal device works on a BWP occupied after the switching, the start moment is a start moment of on duration on duration in a DRX cycle, and the first moment is before the on duration. The processing unit 901 is configured to: perform the BWP switching based on the first information, and work, at the start moment, on the BWP occupied after the switching.

For example, a time interval between the first moment and the start moment of the on duration is greater than specified duration, and the specified duration is greater than or equal to duration for performing the BWP switching by the terminal device.

In a specific implementation, the first information is further used to indicate the terminal device to complete the BWP switching before the on duration. When performing the BWP switching based on the first information, the processing unit 901 is specifically configured to complete the BWP switching based on the first information before the on duration.

In another embodiment, that the terminal device implements functions of the terminal device in the communication method shown in FIG. 6 may be specifically:

The transceiver unit 902 is configured to receive BWP switching indication information from the network device in a slot n, where the BWP switching indication information includes a first value and a minimum value of a first slot difference, and the first slot difference is an interval between a slot in which first data is transmitted and the slot n. The processing unit 901 is configured to: determine a first target slot based on the first value of the first slot difference and the slot n, and start to use the minimum value of the first slot difference in a start position of the first target slot.

In a specific implementation, the BWP switching indication further includes a minimum value of a second slot difference, and the second slot difference is an interval between a slot in which the second data is transmitted and the slot n. The processing unit 901 is further configured to: determine a second target slot based on the first value of the first slot difference, the slot n, a first BWP, and a second BWP, where the first BWP is a BWP occupied after the terminal device performs BWP switching based on the BWP switching indication information, and the second BWP is a BWP occupied after the terminal device performs the BWP switching based on the BWP switching indication information, or the second BWP is a BWP occupied before the terminal device performs the BWP switching based on the BWP switching indication information; and start to use the minimum value of the second slot difference in a start position of the second target slot.

In an example, when the first data is downlink data, the processing unit 901 may determine the first target slot based on the first value of the first slot difference and the slot n according to the following formula:

$$A = \left\lfloor n \cdot \frac{2^{\mu_{PDSCH}}}{2^{\mu_{PDCCH}}} \right\rfloor + X,$$

where

A is an index value of the first target slot, X is the first value of the first slot difference, $\mu_{PDSCH}$ is a numerology of a BWP on which the first data is located, and $\mu_{PDCCH}$ is a numerology of a BWP on which the switching indication information is located.

Specifically, when the first data is downlink data, and the second data is uplink data, the processing unit 901 may determine the second target slot based on the first value of the first slot difference, the slot n, the first BWP, and the second BWP according to the following formula:

$$B = \left\lceil \left( \left\lfloor n \cdot \frac{2^{\mu_{PDSCH}}}{2^{\mu_{PDCCH}}} \right\rfloor + X \right) \cdot \frac{2^{\mu_{UL,BWP}}}{2^{\mu_{DL,BWP}}} \right\rceil,$$

where

B is an index value of the second target slot, X is the first value of the first slot difference, $\mu_{PDSCH}$ is a numerology of a BWP on which the first data is located, $\mu_{PDCCH}$ is a numerology of a BWP on which the switching indication information is located, $\mu_{DL,BWP}$ is a numerology of the first BWP, the first BWP is a downlink BWP, $\mu_{UL,BWP}$ is a numerology of the second BWP, and the second BWP is an uplink BWP.

In another example, when the first data is uplink data, the processing unit 901 may determine the first target slot based on the first value of the first slot difference and the slot n according to the following formula:

$$A = \left\lfloor n \cdot \frac{2^{\mu_{PUSCH}}}{2^{\mu_{PDCCH}}} \right\rfloor + X,$$

where

A is an index value of the first target slot, X is the first value of the first slot difference, $\mu_{PUSCH}$ is a numerology of a BWP on which the first data is located, and $\mu_{PDCCH}$ is a numerology of a BWP on which the switching indication information is located.

Specifically, when the first data is downlink data, and the second data is uplink data, the processing unit 901 may determine the second target slot based on the first value of the first slot difference, the slot n, the first BWP, and the second BWP according to the following formula:

$$B = \left\lceil \left( \left\lfloor n \cdot \frac{2^{\mu_{PUSCH}}}{2^{\mu_{PDCCH}}} \right\rfloor + X \right) \cdot \frac{2^{\mu_{DL,BWP}}}{2^{\mu_{UL,BWP}}} \right\rceil,$$

where

B is an index value of the second target slot, X is the first value of the first slot difference, $\mu_{PDSCH}$ is a numerology of a BWP on which the first data is located, $\mu_{PDCCH}$ is a numerology of a BWP on which the switching indication information is located, $\mu_{UL,BWP}$ is a numerology of the first BWP, the first BWP is an uplink BWP, and $\mu_{DL,BWP}$ is a numerology of the second BWP, and the second BWP is a downlink BWP.

Figure 10:
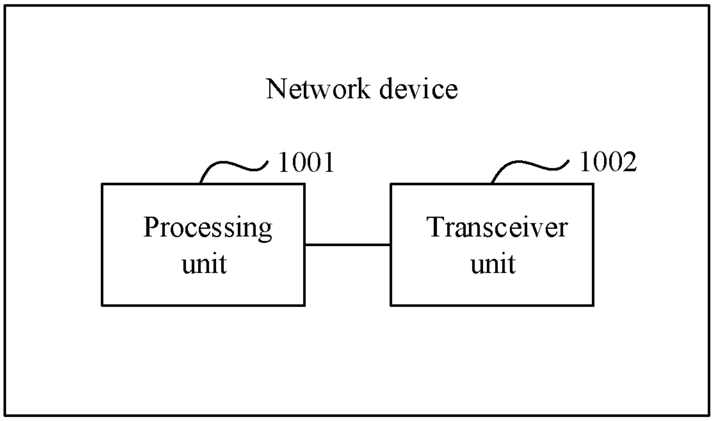
FIG. 10 is a schematic structural diagram of a network device according to this application.

Based on the foregoing embodiments, an embodiment of this application further provides a network device. The network device is applied to the communications system shown in FIG. 1. The network device may be configured to implement the communication method shown in FIG. 4 or FIG. 6. Referring to FIG. 10, the network device may include a processing unit 1001 and a transceiver unit 1002.

In an embodiment, that the network device implements functions of the network device in the communication method shown in FIG. 4 may be specifically:

The processing unit 1001 is configured to determine first information, where the first information is used to indicate bandwidth part BWP switching and indicate a start moment at which a terminal device works on a BWP occupied after the switching, and the start moment is a start moment of on duration on duration in a discontinuous reception DRX cycle. The transceiver unit 1002 is configured to send the first information to the terminal device at a first moment, where the first moment is before the on duration.

Specifically, a time interval between the first moment and the start moment of the on duration is greater than specified duration, and the specified duration is greater than or equal to duration for performing the BWP switching by the terminal device.

In an example, the first information is further used to indicate the terminal device to complete the BWP switching before the on duration.

In another embodiment, that the network device implements functions of the network device in the communication method shown in FIG. 6 may be specifically:

The processing unit 1001 is configured to determine BWP switching indication information, where the BWP switching indication information includes a first value and a minimum value of a first slot difference, and the first slot difference is an interval between a slot in which first data is transmitted and a slot n. The transceiver unit 1002 is configured to send the BWP switching indication information to a terminal device in the slot n.

For example, the BWP switching indication further includes a minimum value of a second slot difference, and the second slot difference is an interval between a slot in which second data is transmitted and the slot n.

It should be noted that, in the embodiments of this application, division in to units is an example, and is merely logical function division. In actual implementation, another division manner may be used. Function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor (processor) to perform all or some of the steps of the methods described in the embodiments of this application. The storage medium includes any medium that can store program code, such as a USB flash drive, a removable hard disk, a read-only memory (read-only memory, ROM), a random access memory (random access memory, RAM), a magnetic disk, or an optical disc.

Figure 11:
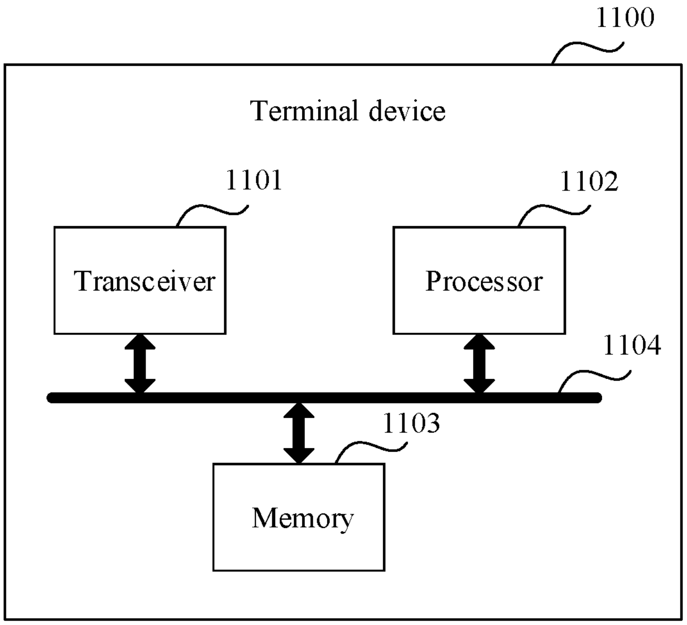
FIG. 11 is a structural diagram of a terminal device according to this application.

Based on the foregoing embodiments, an embodiment of this application further provides a terminal device. The terminal device is configured to implement functions of the terminal device in the communication method shown in FIG. 4 or FIG. 6. Referring to FIG. 11, the terminal device includes a transceiver 1101 and a processor 1102.

The processor 1102 may be a central processing unit (central processing unit, CPU), a network processor (network processor, NP), or a combination of the CPU and the NP. The processor 1102 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field programmable logic gate array (field programmable gate array, FPGA), generic array logic (generic array logic, GAL), or any combination thereof. The processor 1102 may implement the foregoing functions by hardware or by hardware executing corresponding software.

The transceiver 1101 and the processor 1102 are connected to each other. Optionally, the transceiver 1101 and the processor 1102 are connected to each other through a bus 1104. The bus 1104 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of indication, only one thick line is used to represent the bus 1104 in FIG. 11, but it does not mean that there is only one bus or only one type of bus.

Optionally, the terminal device may further include a memory 1103, and the memory 1103 is configured to store a program and the like. Specifically, the program may include program code, and the program code includes a computer operation instruction. The memory 1103 may include a RAM, and may further include a non-volatile memory (non-volatile memory), for example, at least one magnetic disk storage. The processor 1102 performs an application program stored in the memory 1103 to implement the foregoing functions, to implement the communication method shown in FIG. 4 or FIG. 6.

In an embodiment, that the terminal device implements the functions of the terminal device in the communication method shown in FIG. 4 may be specifically:

The transceiver 1101 is configured to receive first information from a network device at a first moment, where the first information is used to indicate BWP switching and indicate a start moment at which the terminal device works on a BWP occupied after the switching, the start moment is a start moment of on duration on duration in a DRX cycle, and the first moment is before the on duration. The processor 1102 is configured to: perform the BWP switching based on the first information, and work, at the start moment, on the BWP occupied after the switching.

For example, a time interval between the first moment and the start moment of the on duration is greater than specified duration, and the specified duration is greater than or equal to duration for performing the BWP switching by the terminal device.

In a specific implementation, the first information is further used to indicate the terminal device to complete the BWP switching before the on duration. When performing the BWP switching based on the first information, the processor 1102 is specifically configured to complete the BWP switching based on the first information before the on duration.

In another embodiment, that the terminal device implements the functions of the terminal device in the communication method shown in FIG. 6 may be specifically:

The transceiver 1101 is configured to receive BWP switching indication information from a network device in a slot n, where the BWP switching indication information includes a first value and a minimum value of a first slot difference, and the first slot difference is an interval between a slot in which first data is transmitted and a slot n. The processor 1102 is configured to: determine a first target slot based on the first value of the first slot difference and the slot n, and start to use the minimum value of the first slot difference in a start position of the first target slot.

In a specific implementation, the BWP switching indication further includes a minimum value of a second slot difference, and the second slot difference is an interval between a slot in which second data is transmitted and the slot n. The processor 1102 is further configured to: determine a second target slot based on the first value of the first slot difference, the slot n, a first BWP, and a second BWP, where the first BWP is a BWP occupied after the terminal device performs BWP switching based on the BWP switching indication information, and the second BWP is a BWP occupied after the terminal device performs the BWP switching based on the BWP switching indication information, or the second BWP is a BWP occupied before the terminal device performs the BWP switching based on the BWP switching indication information; and start to use the minimum value of the second slot difference in a start position of the second target slot.

In an example, when the first data is downlink data, the processor 1102 may determine the first target slot based on the first value of the first slot difference and the slot n according to the following formula:

$$A = \left\lfloor n \cdot \frac{2^{\mu_{PDSCH}}}{2^{\mu_{PDCCH}}} \right\rfloor + X,$$

where

A is an index value of the first target slot, X is the first value of the first slot difference, $\mu_{PDSCH}$ is a numerology of a BWP on which the first data is located, and $\mu_{PDCCH}$ is a numerology of a BWP on which the switching indication information is located.

Specifically, when the first data is downlink data, and the second data is uplink data, the processor 1102 may determine the second target slot based on the first value of the first slot difference, the slot n, the first BWP, and the second BWP according to the following formula:

$$B = \left\lceil \left( \left\lfloor n \cdot \frac{2^{\mu_{PDSCH}}}{2^{\mu_{PDCCH}}} \right\rfloor + X \right) \cdot \frac{2^{\mu_{UL,BWP}}}{2^{\mu_{DL,BWP}}} \right\rceil,$$

where

B is an index value of the second target slot, X is the first value of the first slot difference, $\mu_{PDSCH}$ is a numerology of a BWP on which the first data is located, $\mu_{PDCCH}$ is a numerology of a BWP on which the switching indication information is located, $\mu_{DL,BWP}$ is a numerology of the first BWP, the first BWP is a downlink BWP, $\mu_{UL,BWP}$ is a numerology of the second BWP, and the second BWP is an uplink BWP.

In another example, when the first data is uplink data the processor 1102 may determine the first target slot based on the first value of the first slot difference and the slot n according to the following formula:

$$A = \left\lfloor n \cdot \frac{2^{\mu_{PUSCH}}}{2^{\mu_{PDCCH}}} \right\rfloor + X,$$

where

A is an index value of the first target slot, X is the first value of the first slot difference, $\mu_{PUSCH}$ is a numerology of a BWP on which the first data is located, and $\mu_{PDCCH}$ is a numerology of a BWP on which the switching indication information is located.

Specifically, when the first data is downlink data, and the second data is uplink data, the processor 1102 may determine the second target slot based on the first value of the first slot difference, the slot n, the first BWP, and the second BWP according to the following formula:

$$B = \left\lceil \left( \left\lfloor n \cdot \frac{2^{\mu_{PUSCH}}}{2^{\mu_{PDCCH}}} \right\rfloor + X \right) \cdot \frac{2^{\mu_{DL,BWP}}}{2^{\mu_{UL,BWP}}} \right\rceil,$$

where

B is an index value of the second target slot, X is the first value of the first slot difference, $\mu_{PDSCH}$ is a numerology of a BWP on which the first data is located, $\mu_{PDCCH}$ is a numerology of a BWP on which the switching indication information is located, is $\mu_{UL,BWP}$ is a numerology of the first BWP, the first BWP is an uplink BWP, and $\mu_{DL,BWP}$ is a numerology of the second BWP, and the second BWP is a downlink BWP.

Figure 12:
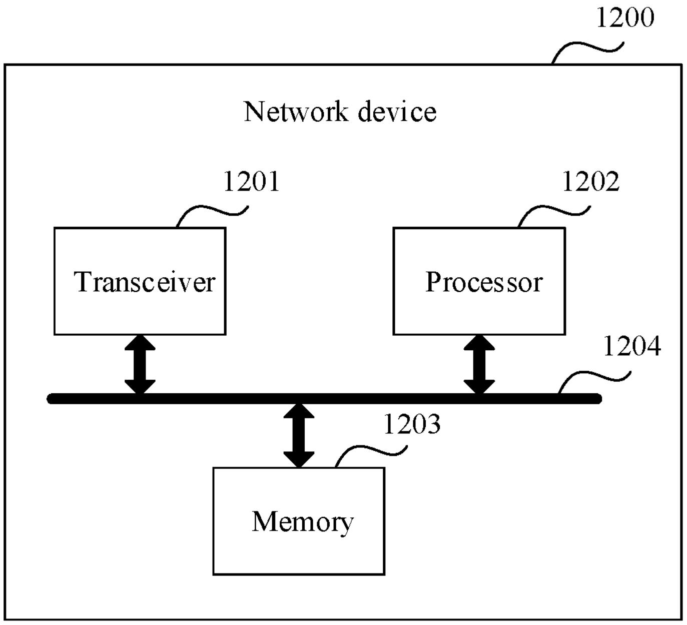
FIG. 12 is a structural diagram of a network device according to this application.

Based on the foregoing embodiments, an embodiment of this application further provides a network device. The network device is configured to implement functions of the network device in the communication method shown in FIG. 4 or FIG. 6. Referring to FIG. 12, the network device includes: a transceiver 1201 and a processor 1202.

The processor 1202 may be a central processing unit (central processing unit, CPU), a network processor (network processor, NP), or a combination of the CPU and the NP. The processor 1202 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable logic gate array (field-programmable gate array, FPGA), generic array logic (generic array logic, GAL), or any combination thereof. The processor 1202 may implement the foregoing functions by hardware or by hardware executing corresponding software.

The transceiver 1201 and the processor 1202 are connected to each other. Optionally, the transceiver 1201 and the processor 1202 are connected to each other through a bus 1204. The bus 1204 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of indication, only one thick line is used to represent the bus in FIG. 12, but it does not mean that there is only one bus or only one type of bus.

Optionally, the network device may further include a memory 1203, and the memory 1203 is configured to store a program and the like. Specifically, the program may include program code, and the program code includes a computer operation instruction. The memory 1203 may include a RAM, and may further include a non-volatile memory (non-volatile memory), for example, at least one magnetic disk storage. The processor 1202 performs an application program stored in the memory 1203 to implement the foregoing functions, to implement the communication method shown in FIG. 4 or FIG. 6.

In an embodiment, that the network device implements the functions of the network device in the communication method shown in FIG. 4 may be specifically:

The processor 1202 is configured to determine first information, where the first information is used to indicate bandwidth part BWP switching and indicate a start moment at which a terminal device works on a BWP occupied after the switching, and the start moment is a start moment of on duration on duration in a discontinuous reception DRX cycle. The transceiver 1201 is configured to send the first information to the terminal device at a first moment, where the first moment is before the on duration.

Specifically, a time interval between the first moment and the start moment of the on duration is greater than specified duration, and the specified duration is greater than or equal to duration for performing the BWP switching by the terminal device.

In an example, the first information is further used to indicate the terminal device to complete the BWP switching before the on duration.

In another embodiment, that the network device implements the functions of the network device in the communication method shown in FIG. 6 may be specifically:

The processor 1202 is configured to determine BWP switching indication information, where the BWP switching indication information includes a first value and a minimum value of a first slot difference, and the first slot difference is an interval between a slot in which first data is transmitted and a slot n. The transceiver 1201 is configured to send the BWP switching indication information to the terminal device in the slot n.

For example, the BWP switching indication information further includes a minimum value of a second slot difference, and the second slot difference is an interval between a slot in which second data is transmitted and the slot n.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of another programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operation steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Definitely, a person skilled in the art can make various modifications and variations to the embodiments of this application without departing from the scope of the embodiments of this application. This application is intended to cover these modifications and variations provided that they fall within the scope of protection defined by the following claims and their equivalent technologies.

The invention claimed is:

1. A communication method, comprising:

receiving first downlink control information (DCI) in a slot n, wherein the first DCI schedules a first data transmitted in a first target slot, the first DCI indicates to a terminal device to switch an active bandwidth part (BWP) among a plurality of BWPs configured for the terminal device, each BWP being a part of a system bandwidth configured by a network device for communication with the terminal device, and the first DCI indicates a first value and a minimum value of a first slot difference, wherein the first value is an interval between the first target slot and the slot n, wherein in response to the first data being downlink data, the first slot difference is K0 indicating an interval between a slot in which a physical downlink control channel (PDCCH) is received and a slot in which a physical downlink shared channel (PDSCH) scheduled by the PDCCH is transmitted, or in response to the first data being uplink data, the first slot difference is K2 indicating an interval between a slot in which a PDCCH is received and a slot in which a physical uplink shared channel (PUSCH) scheduled by the PDCCH is transmitted;

determining the first target slot based on the first value and the slot n; and applying the minimum value of the first slot difference in a start position of the first target slot, wherein after the minimum value of the first slot difference is applied, a new interval between a slot in which a second DCI is received and a slot in which a second data scheduled by the second DCI is transmitted is no less than the minimum value of the first slot difference.

2. The method according to claim 1, comprising:

determining the first target slot based on the first value and the slot n according to the following equation:

$$A = \left\lfloor n \cdot \frac{2^{\mu_{PDSCH}}}{2^{\mu_{PDCCH}}} \right\rfloor + X,$$

wherein the first data is downlink data, A is an index value of the first target slot, X is the first value, $\mu_{PDSCH}$ is a numerology of a BWP on which the first data is located, and $\mu_{PDCCH}$ is a numerology of a BWP on which the first DCI is located.

3. The method according to claim 1, comprising:

determining the first target slot based on the first value and the slot n according to the following equation:

$$A = \left\lfloor n \cdot \frac{2^{\mu_{PUSCH}}}{2^{\mu_{PDCCH}}} \right\rfloor + X,$$

wherein the first data is uplink data, A is an index value of the first target slot, X is the first value, $\mu_{PUSCH}$ is a numerology of a BWP on which the first data is located, and $\mu_{PDCCH}$ is a numerology of a BWP on which the first DCI is located.

4. The method according to claim 1, wherein the first DCI indicates the terminal device to perform BWP switching.

5. The method according to claim 1, wherein the first target slot is an effective timeslot of BWP switching.

6. The method according to claim 1, wherein the first DCI further indicates a minimum value of a second slot difference, wherein in response to the first data being downlink data, the second slot difference is the K2, or in response to the first data being uplink data, the second slot difference is the K0.

7. A communication apparatus, comprising:

a non-transitory memory storage comprising instructions; and one or more processors in communication with the memory storage, wherein the instructions, when executed by the one or more processors, cause the apparatus to:

receive first downlink control information (DCI) in a slot n, wherein the first DCI schedules a first data transmitted in a first target slot, the first DCI indicates to a terminal device to switch an active bandwidth part (BWP) among a plurality of BWPs configured for the terminal device, each BWP being a part of a system bandwidth configured by a network device for communication with the terminal device, and the first DCI indicates a first value and a minimum value of a first slot difference, wherein the first value is an interval between the first target slot and the slot n, wherein in response to the first data being downlink data, the first slot difference is K0 indicating an interval between a slot in which a physical downlink control channel (PDCCH) is received and a slot in which a physical downlink shared channel (PDSCH) scheduled by the PDCCH is transmitted, or in response to the first data being uplink data, the first slot difference is K2 indicating an interval between a slot in which a PDCCH is received and a slot in which a physical uplink shared channel (PUSCH) scheduled by the PDCCH is transmitted;

determine the first target slot based on the first value and the slot n; and apply the minimum value of the first slot difference in a start position of the first target slot, wherein after the minimum value of the first slot difference is applied, a new interval between a slot in which a second DCI is received and a slot in which a second data scheduled by the second DCI is transmitted is no less than the minimum value of the first slot difference.

8. The communication apparatus according to claim 7, wherein the instructions, when executed by the one or more processors, cause the apparatus to:

determine the first target slot based on the first value and the slot n according to the following equation:

$$A = \left\lfloor n \cdot \frac{2^{\mu_{PDSCH}}}{2^{\mu_{PDCCH}}} \right\rfloor + X,$$

wherein the first data is downlink data, A is an index value of the first target slot, X is the first value, $\mu_{PDSCH}$ is a numerology of a BWP on which the first data is located, and $\mu_{PDCCH}$ is a numerology of a BWP on which the first DCI is located.

9. The communication apparatus according to claim 7, wherein the instructions, when executed by the one or more processors, cause the apparatus to:

determine the first target slot based on the first value and the slot n according to the following equation:

$$A = \left\lfloor n \cdot \frac{2^{\mu_{PUSCH}}}{2^{\mu_{PDCCH}}} \right\rfloor + X,$$

wherein the first data is uplink data, A is an index value of the first target slot, X is the first value, $\mu_{PUSCH}$ is a numerology of a BWP on which the first data is located, and $\mu_{PDCCH}$ is a numerology of a BWP on which the first DCI is located.

10. The communication apparatus according to claim 7, wherein the first DCI indicates the terminal device to perform BWP switching.

11. The communication apparatus according to claim 7, wherein the first target slot is an effective timeslot of BWP switching.

12. The communication apparatus according to claim 7, wherein the first DCI further indicates a minimum value of a second slot difference, wherein in response to the first data being downlink data, the second slot difference is the K2, or in response to the first data being uplink data, the second slot difference is the K0.

13. A communication apparatus, comprising:

a non-transitory memory storage comprising instructions; and one or more processors in communication with the memory storage, wherein the instructions, when executed by the one or more processors, cause the apparatus to:

determine first downlink control information (DCI), wherein the first DCI schedules a first data transmitted in a first target slot, the first DCI indicates to a terminal device to switch an active bandwidth part (BWP) among a plurality of BWPs configured for the terminal device, each BWP being a part of a system bandwidth configured by a network device for communication with the terminal device, and the first DCI indicates a first value and a minimum value of a first slot difference, wherein the first value is an interval between the first target slot and a slot n, wherein in response to the first data being downlink data, the first slot difference is K0 indicating an interval between a slot in which a physical downlink control channel (PDCCH) is received and a slot in which a physical downlink shared channel (PDSCH) scheduled by the PDCCH is transmitted, or in response to the first data being uplink data, the first slot difference is K2 indicating an interval between a slot in which a PDCCH is received and a slot in which a physical uplink shared channel (PUSCH) scheduled by the PDCCH is transmitted; and send the first DCI to the terminal device in the slot n, wherein after the minimum value of the first slot difference is applied, a new interval between a slot in which a second DCI is received and a slot in which a second data scheduled by the second DCI is transmitted is no less than the minimum value of the first slot difference.

14. The communication apparatus according to claim 13, wherein the first DCI indicates the terminal device to perform BWP switching.

15. The communication apparatus according to claim 13, wherein the first target slot is an effective timeslot of BWP switching.

16. The communication apparatus according to claim 13, wherein the first DCI further indicates a minimum value of a second slot difference, wherein in response to the first data being downlink data, the second slot difference is the K2, or in response to the first data being uplink data, the second slot difference is the K0.

17. A communication method, comprising:

determining first downlink control information (DCI), wherein the first DCI schedules a first data transmitted in a first target slot, the first DCI indicates to a terminal device to switch an active bandwidth part (BWP) among a plurality of BWPs configured for the terminal device, each BWP being a part of a system bandwidth configured by a network device for communication with the terminal device, and the first DCI indicates a first value and a minimum value of a first slot difference, wherein the first value is an interval between the first target slot and a slot n, wherein in response to the first data being downlink data, the first slot difference is K0 indicating an interval between a slot in which a physical downlink control channel (PDCCH) is received and a slot in which a physical downlink shared channel (PDSCH) scheduled by the PDCCH is transmitted, or in response to the first data being uplink data, the first slot difference is K2 indicating an interval between a slot in which a PDCCH is received and a slot in which a physical uplink shared channel (PUSCH) scheduled by the PDCCH is transmitted; and sending the first DCI to the terminal device in the slot n, wherein after the minimum value of the first slot difference is applied, a new interval between a slot in which a second DCI is received and a slot in which a second data scheduled by the second DCI is transmitted is no less than the minimum value of the first slot difference.

18. The method according to claim 17, wherein the first DCI indicates the terminal device to perform BWP switching.

19. The method according to claim 17, wherein the first target slot is an effective timeslot of BWP switching.

20. The method according to claim 17, wherein the first DCI further indicates a minimum value of a second slot difference, wherein in response to the first data being downlink data, the second slot difference is the K2, or in response to the first data being uplink data, the second slot difference is the K0.

* * * * *